(12) United States Patent
Golden et al.

(10) Patent No.: US 10,929,932 B1
(45) Date of Patent: Feb. 23, 2021

(54) METHOD AND APPARATUS FOR PARSING AND DIFFERENTLY PROCESSING ELECTRONIC MESSAGES

(71) Applicant: McKesson Corporation, Irving, TX (US)

(72) Inventors: John Golden, Roswell, GA (US); Patrick Harris, Brookhaven, GA (US)

(73) Assignee: MCKESSON CORPORATION, Irving, TX (US)

( * ) Notice: Subject to any disclaimer, the term of this patent is extended or adjusted under 35 U.S.C. 154(b) by 0 days.

(21) Appl. No.: 15/925,948

(22) Filed: Mar. 20, 2018

Related U.S. Application Data

(63) Continuation-in-part of application No. 15/422,184, filed on Feb. 1, 2017.

(51) Int. Cl.
*G06Q 40/08* (2012.01)
*H04L 12/58* (2006.01)

(52) U.S. Cl.
CPC .............. *G06Q 40/08* (2013.01); *H04L 51/04* (2013.01); *H04L 51/26* (2013.01)

(58) Field of Classification Search
CPC ..................................................... G06Q 40/08
See application file for complete search history.

(56) References Cited

U.S. PATENT DOCUMENTS

| 2001/0039589 A1 | 11/2001 | Aho et al. |
| 2006/0085385 A1 | 4/2006 | Foster et al. |
| 2007/0202886 A1 | 8/2007 | Dhebri et al. |
| 2007/0260750 A1 | 11/2007 | Feied et al. |
| 2013/0041968 A1* | 2/2013 | Cohen ..................... H04L 51/24 709/206 |

(Continued)

FOREIGN PATENT DOCUMENTS

| CN | 102362778 | 2/2012 |
| KR | 100755440 | 9/2007 |

(Continued)

OTHER PUBLICATIONS

Office Action for U.S. Appl. No. 15/422,184 dated Feb. 15, 2019.

(Continued)

*Primary Examiner* — Nicholas P Celani
(74) *Attorney, Agent, or Firm* — Alston & Bird LLP

(57) ABSTRACT

A method, computing device and computer program product parse an electronic message and construct multiple differently prioritized messages. An electronic message is parsed to separately identify first and second differently formatted portions and the electronic message is analyzed to identify an action to be taken. In response to identification of a first action, a first message is constructed based upon the first portion to be transmitted to a first request processor and a first response is then received from the first request processor. A second message is constructed based upon the second portion. The method analyzes the first response and, when the first response is of a first type, causes the second message to be transmitted to a second request processor and based upon the second message, receives a second response from the second request processor. The method then constructs a response to the electronic message.

23 Claims, 4 Drawing Sheets

(56) References Cited

U.S. PATENT DOCUMENTS

| | | | | |
|---|---|---|---|---|
| 2015/0088557 A1* | 3/2015 | Huynh | ............... | G06Q 40/08 705/4 |
| 2015/0149197 A1 | 5/2015 | Guinan | | |
| 2015/0154565 A1* | 6/2015 | Kaehler | ............ | G06Q 40/12 705/322 |
| 2015/0213195 A1 | 7/2015 | Blechman | | |
| 2016/0307195 A1 | 10/2016 | Cantwell et al. | | |

FOREIGN PATENT DOCUMENTS

| | | |
|---|---|---|
| KR | 100793852 | 1/2008 |
| KR | 101038074 | 6/2011 |
| KR | 101101692 | 12/2011 |
| KR | 20110138108 | 12/2011 |
| KR | 20110138572 | 12/2011 |
| KR | 101154858 | 6/2012 |

OTHER PUBLICATIONS

Decision to Grant European Patent Application No. 13809457.8 dated May 18, 2017.
Extended European Search Report for European Application No. 13809457.8 dated Apr. 15, 2016.
Office Action for U.S. Appl. No. 15/422,184 dated Sep. 10, 2018.
Office Action for U.S. Appl. No. 15/925,011 dated Jun. 27, 2019.
Office Action for U.S. Appl. No. 15/422,184 dated Aug. 27, 2019.
Office Action for U.S. Appl. No. 15/925,011 dated Oct. 24, 2019.
Office Action for U.S. Appl. No. 15/422,184 dated Jan. 14, 2020.
United States Patent and Trademark Office, Advisory Action for U.S. Appl. No. 15/422,184, dated Mar. 26, 2020, 5 pages, U.S.A.
United States Patent and Trademark Office, Office Action for U.S. Appl. No. 15/925,011, dated Apr. 8, 2020, 27 pages, U.S.A.
United States Patent and Trademark Office, Office Action received for U.S. Appl. No. 15/422,184, dated May 18, 2020, 31 pages, U.S.A.
United States Patent and Trademark Office, Advisory Action for U.S. Appl. No. 15/925,011, dated Jan. 31, 2020, 4 pages, U.S.A.
United States Patent and Trademark Office, Advisory Action for U.S. Appl. No. 15/422,184, dated Jun. 25, 2019, 4 pages, U.S.A.
United States Patent and Trademark Office, Office Action received for U.S. Appl. No. 15/925,011, dated Oct. 8, 2020, 22 pages, U.S.A.
United States Patent and Trademark Office, Notice of Allowance received for U.S. Appl. No. 15/422,184, dated Oct. 13, 2020, 12 pages, U.S.A.

* cited by examiner

US 10,929,932 B1

METHOD AND APPARATUS FOR PARSING AND DIFFERENTLY PROCESSING ELECTRONIC MESSAGES

CROSS-REFERENCE TO RELATED APPLICATIONS

This application is a continuation-in-part of U.S. application Ser. No. 15/422,184, filed Feb. 1, 2017, the entire contents of which are incorporated herein by reference.

TECHNOLOGICAL FIELD

An example embodiment of the present invention relates to parsing an electronic message and to constructing multiple differently prioritized messages therefrom.

BACKGROUND

Messages are frequently transmitted in accordance with a predefined structure. The predefined structure generally defines the fields of information included within the message and the format in which the information is presented within each of the fields. While structured messages of this type are useful in terms of insuring that at least certain types of information are included within the message and that those certain types of information are transmitted in a manner that may be readily and consistently interpreted by the recipient, structured messages may limit the types of information that are conveyed and correspondingly limit the functionality that can be supported by messages having the predefined structure.

By way of example, the limitations upon the information that may be conveyed via a structured message and the format in which the information must be conveyed may prevent that message from supporting additional functionality needed by the sender or recipient, or require supplemental messages to be transmitted in order to provide additional information to the same recipient, particularly in instances in which the additional information is required in order for the recipient to perform additional functionality or services. This increase in the number of messages so as to provide additional information beyond that supported by structured messages not only increases the complexity and processing demands upon the source and recipient of the messages in order for the source to construct such supplemental messages, and for the recipient to link and interpret the additional messages, but also increases the load upon the network that must transmit the additional messages, as well as the risk of loss of such additional information in the event of errors when attempting to link or associate the supplemental messages.

By preventing a message from supporting additional functionality needed by the sender or recipient, the limitations upon the information that may be conveyed via a structured message may in some instances require the sender and recipient to develop a different work flow in order to support the additional functionality. For example, the sender and recipient may define a batch process for conveying the information that is not supported by the structured messages. As such, a time delay is created between the time at which the messages could otherwise have been transmitted in real time or near real time and the time at which the messages are submitted in batch format. As a result, the responses to the messages submitted in batch format are necessarily delayed and are not provided in real time or near real time, thereby limiting or even eliminating the usefulness of the responses for some applications that are dependent upon more timely feedback. Moreover, the development and support of alternative work flows for functionality that is not supported by the structured messages complicates the interaction between the parties by imposing additional and different work flows that must be followed in certain situations.

BRIEF SUMMARY

A method, computing device and computer program product are provided in accordance with an example embodiment in order to facilitate the inclusion of additional information in a single message beyond that for which the original message structure is predefined. As a result, the functionality or services performed by or for the source or recipient of the message may be enhanced by reliance upon the additional information that may be included in the message. By including additional information in the message in a manner that is able to be interpreted by the source or recipient, the method, computing device and computer program product of an example embodiment reduces or at least limits any increase in the number of messages transmitted between a source and the recipient in order to convey the additional information so as to enable the provision of the additional functionality or services, thereby reducing or limiting any increase in the load otherwise imposed upon the network that supports the delivery of the messages. Similarly, the method, computing device and computer program product of an example embodiment increase the efficiency with which the source and recipient communicate by reducing the number of messages that must be constructed by the source and linked and interpreted by the recipient in order to convey the additional information, as well as reducing or eliminating the risk of loss of such additional information in the event of errors when attempting to link or associate the supplemental messages. Further, the method, computing device and computer program product of an example embodiment permit sufficient information to be included within the message such that some messages that otherwise must be submitted in accordance with a different work flow, such as in a batch format so as to generate a delayed response, may now be submitted and processed in a single message, thereby avoiding the delays and additional storage and processing requirements necessitated by batch processing and facilitating an enhanced user experience as a result of the timely responses for each of the different types of messages.

In one embodiment, a computing device is provided to parse an electronic message and to construct multiple differently prioritized messages therefrom. The computing device includes a communication interface configured to receive the electronic message that includes a first portion formatted in accordance with a first predefined format and a second portion formatted differently than the first predefined portion. The computing device also includes processing circuitry configured to parse the electronic message to separately identify the first and second portions and to analyze the electronic message to identify an action to be taken based thereupon. In response to identification of a first action to be taken, the processing circuitry is configured to construct a first message based at least in part upon the first portion formatted in accordance with the first predefined format to be transmitted to a first request processor. Based upon the first message including the first portion formatted in accordance with the first predefined format, the processing circuitry is configured to receive a first response from the first request processor. The processing circuitry is also configured to construct a second message based at least in part upon the second portion formatted in accordance with the second predefined format. The processing circuitry is further configured to analyze the first response and, in an instance in which the first response is of a first type, cause the second message that is constructed based at least in part upon the second portion formatted in accordance with the second predefined format to be transmitted to a second request processor, different than the first request processor, and based upon the second message, receive a second response from the second request processor. Based upon at least one of the first response from the first request processor or the second response from the second request processor, the processing circuitry is configured to construct a response to the electronic message that is to be transmitted. The computing device also includes a database in communication with the processing circuitry and configured to store one or more of the electronic message, the first message, the first response, the second message, the second response or the response to the electronic message.

The processing circuitry of an example embodiment is configured to analyze the electronic message by identifying a qualifier field indicative of the action to be taken. In response to identification of a second action, different than the first action, to be taken, the processing circuitry of an example embodiment is configured to construct the second message, to cause the second message to be transmitted to the second request processor and to receive the second response, without first constructing the first message. The processing circuitry of an example embodiment is configured to construct the second message only after analysis of the first response indicates that the first response is of a first type. The processing circuitry of an example embodiment is configured to construct the second message based upon parts of both the first and second portions of the electronic message. The processing circuitry of an example embodiment is configured to construct the first message based upon the first portion of the electronic message without reference to the second portion of the electronic message. In an example embodiment, the first action includes an adjudication request for a pharmacy claim, wherein the first type of the first response includes a denial of the pharmacy claim and wherein the second action includes an adjudication request for a medical claim.

In another example embodiment, a method is provided for parsing an electronic message and constructing multiple differently prioritized messages therefrom. The method includes receiving an electronic message including a first portion formatted in accordance with a first predefined format and a second portion formatted differently than the first predefined portion. The method parses the electronic message to separately identify the first and second portions and analyzes the electronic message to identify an action to be taken based thereupon. In response to identification of a first action to be taken, the method constructs a first message based at least in part upon the first portion formatted in accordance with the first predefined format to be transmitted to a first request processor. Based upon the first message including the first portion formatted in accordance with the first predefined format, the method receives a first response from the first request processor. The method also constructs a second message based at least in part upon the second portion formatted in accordance with the second predefined format. The method additionally analyzes the first response and, in an instance in which the first response is of a first type, causes the second message that is constructed based at least in part upon the second portion formatted in accordance with the second predefined format to be transmitted to a second request processor, different than the first request processor, and based upon the second message, receives a second response from the second request processor. Based upon at least one of the first response from the first request processor or the second response from the second request processor, the method constructs a response to the electronic message that is to be transmitted. The method also stores, in a database, one or more of the electronic message, the first message, the first response, the second message, the second response or the response to the electronic message.

The method of an example embodiment analyzes the electronic message by identifying a qualifier field indicative of the action to be taken. In response to identification of a second action, different than the first action, to be taken, the method of an example embodiment also constructs the second message, causes the second message to be transmitted to the second request processor and receives the second response, without first constructing the first message. In an example embodiment, the second message is constructed only after analysis of the first response indicates that the first response is of a first type. The method of an example embodiment constructs the second message by constructing the second message based upon parts of both the first and second portions of the electronic message. The method of an example embodiment constructs the first message by constructing the first message based upon the first portion of the electronic message without reference to the second portion of the electronic message. In an example embodiment, the first action includes an adjudication request for a pharmacy claim, the first type of the first response includes a denial of the pharmacy claim and the second action includes an adjudication request for a medical claim.

In a further example embodiment, a computer program product is provided that is configured to parse an electronic message and construct multiple differently prioritized messages therefrom. The computer program product includes a non-transitory computer readable medium having program code stored thereon with the program code including program code instructions configured, upon execution, to receive an electronic message comprising a first portion formatted in accordance with a first predefined format and a second portion formatted differently than the first predefined portion, to parse the electronic message to separately identify the first and second portions and to analyze the electronic message to identify an action to be taken based thereupon. The program code also includes program code instructions configured to construct, in response to identification of a first action to be taken, a first message based at least in part upon the first portion formatted in accordance with the first predefined format to be transmitted to a first request processor. The program code also includes program code instructions configured to receive a first response from the first request processor based upon the first message including the first portion formatted in accordance with the first predefined format. The program code also includes program code instructions configured to construct a second message based at least in part upon the second portion formatted in accordance with the second predefined format. The program code further includes program code instructions configured to analyze the first response and, in an instance in which the first response is of a first type, cause the second message that is constructed based at least in part upon the second portion formatted in accordance with the second predefined format to be transmitted to a second request processor, different than the first request processor, and based upon the second message, receive a second response from the second request processor. The program code further includes program code instructions configured to construct, based upon at least one of the first response from the first request processor or the second response from the second request processor, a response to the electronic message that is to be transmitted. Further, the program code includes program code instructions configured to store, in a database, one or more of the electronic message, the first message, the first response, the second message, the second response or the response to the electronic message.

In an example embodiment, the program code instructions configured to analyze the electronic message include program code instructions configured to identify a qualifier field indicative of the action to be taken. The program code of an example embodiment further include program code instructions configured, in response to identification of a second action, different than the first action, to be taken, to construct the second message, to cause the second message to be transmitted to the second request processor and to receive the second response, without first constructing the first message. In an example embodiment, the program code instructions configured to construct the second message include program code instructions configured to construct the second message only after analysis of the first response indicates that the first response is of a first type. The program code instructions configured to construct the second message in accordance with an example embodiment include program code instructions configured to construct the second message based upon parts of both the first and second portions of the electronic message. In an example embodiment, the program code instructions configured to construct the first message include program code instructions configured to construct the first message based upon the first portion of the electronic message without reference to the second portion of the electronic message.

BRIEF DESCRIPTION OF THE DRAWINGS

Figure 1:
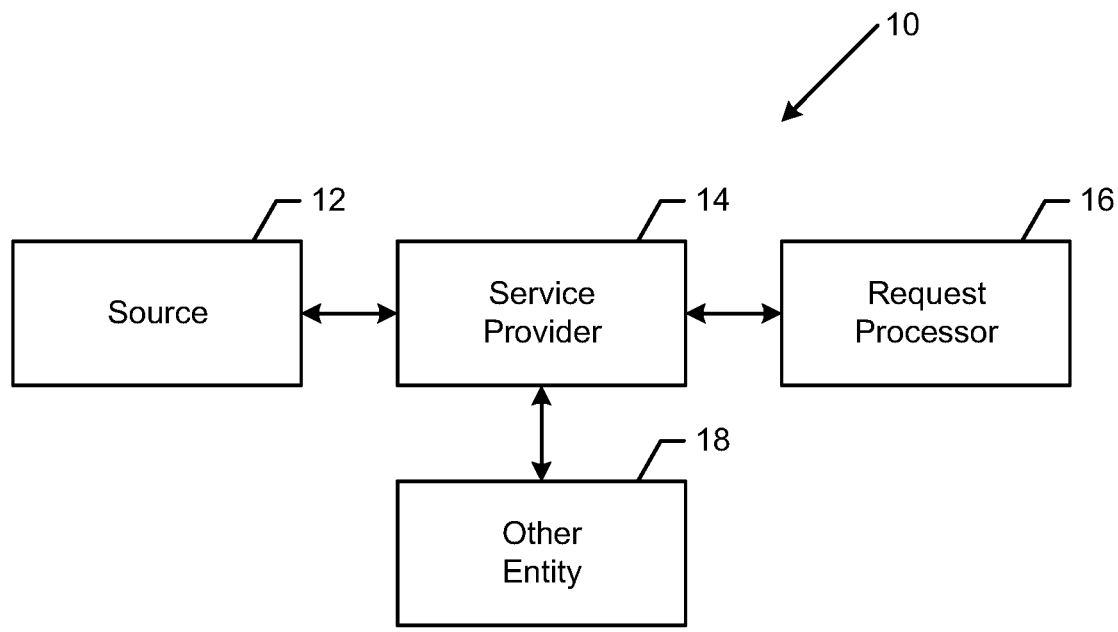
Figure 2:
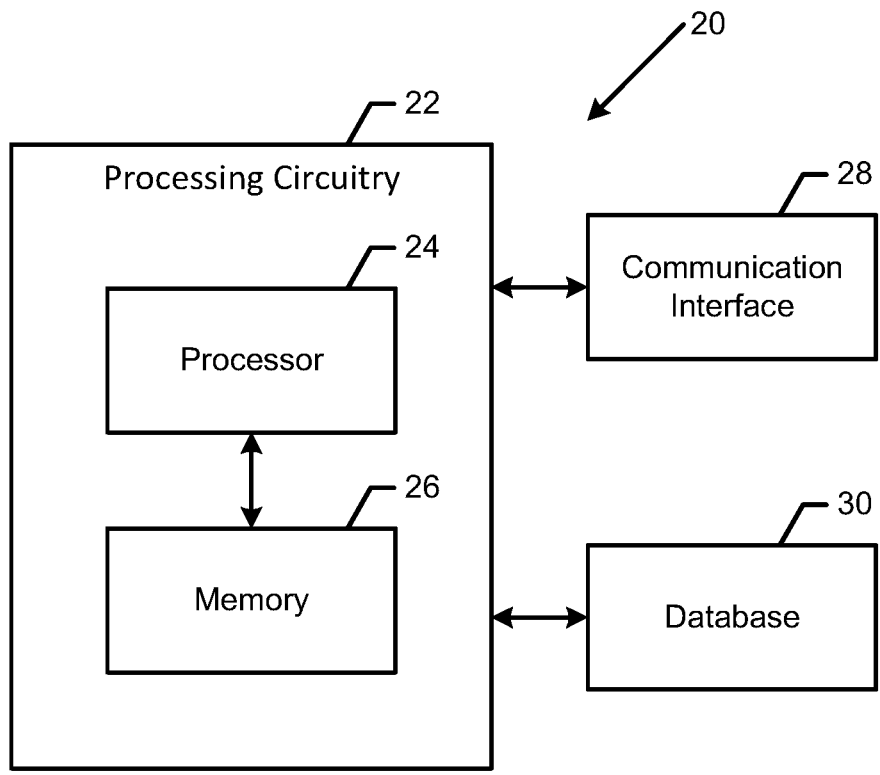
Figure 3:
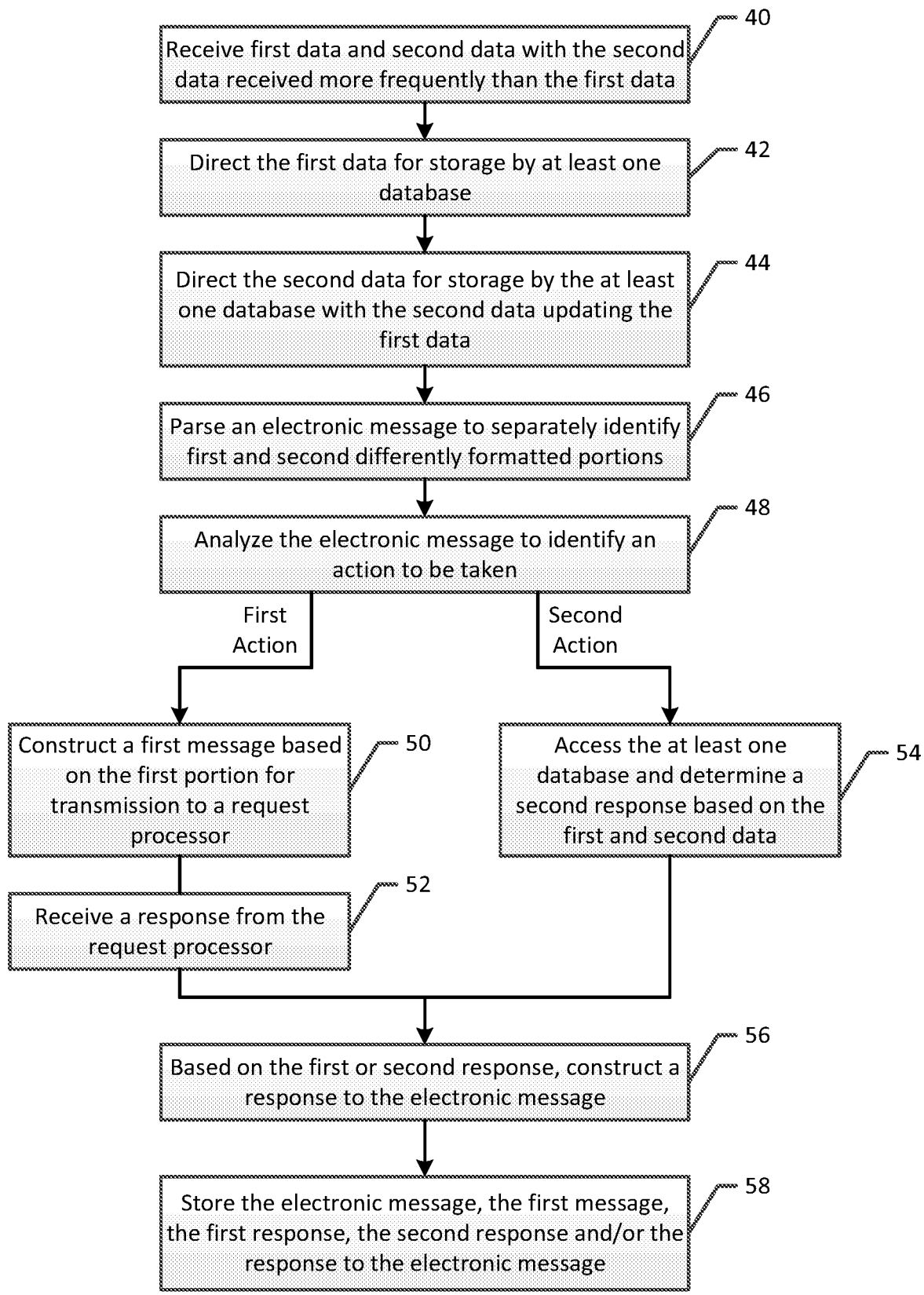
Figure 4:
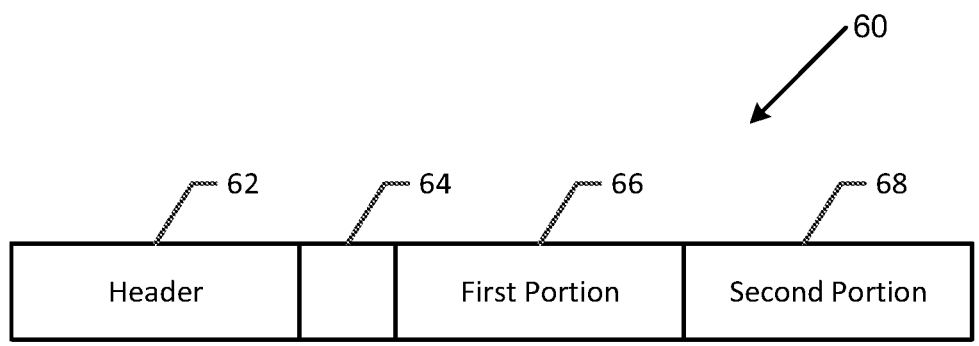
Figure 5:
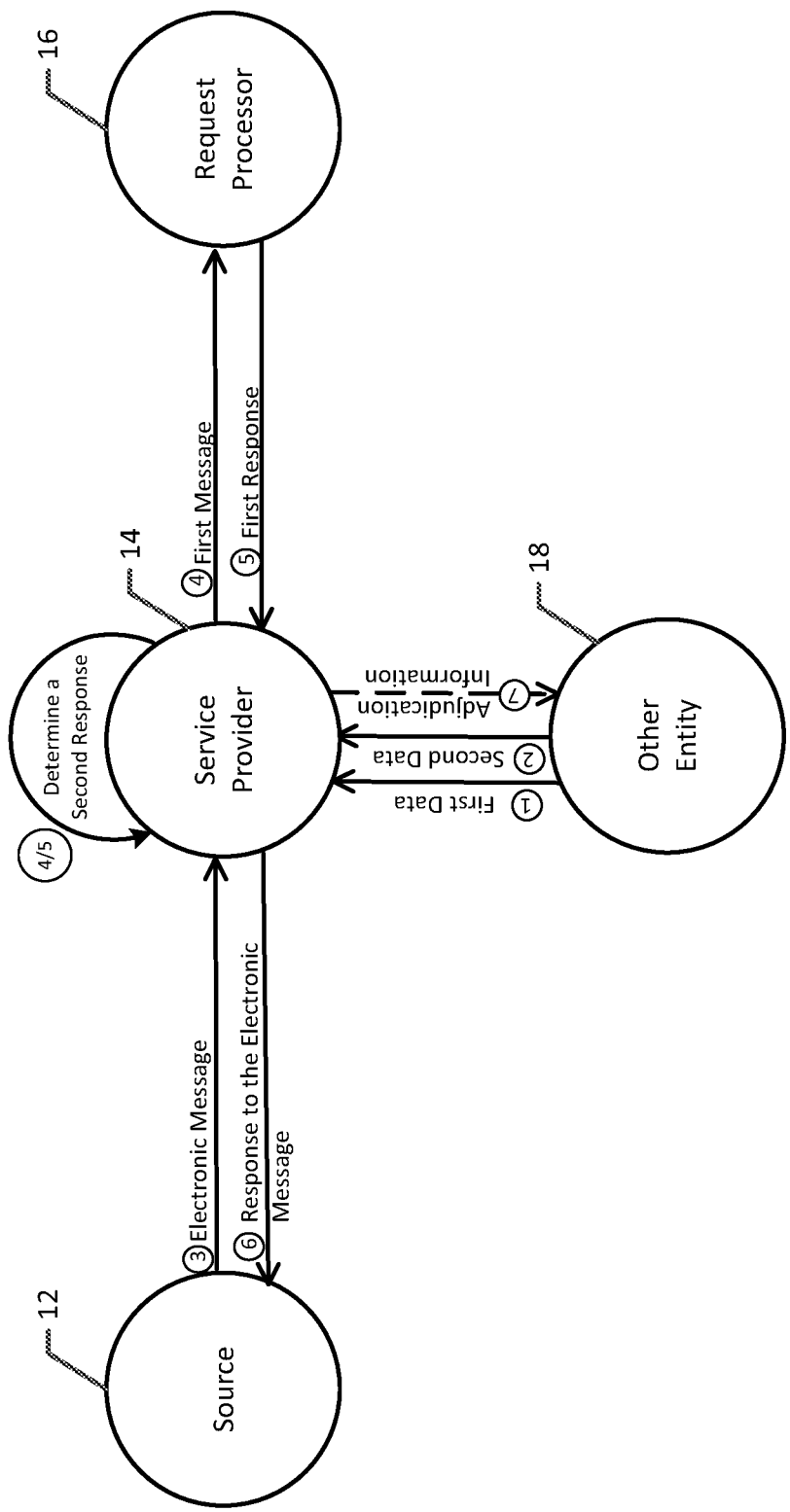

Having thus described certain embodiments of the invention in general terms, reference will now be made to the accompanying drawings, which are not necessarily drawn to scale, and wherein:

FIG. 1 is a diagram of a system configured to parse and differently process electronic messages in accordance with an example embodiment of the present invention;

FIG. 2 is a block diagram of a computing device that may be specifically configured in accordance with an example embodiment of the present invention;

FIG. 3 is a flow chart illustrating the operations performed, such as by the switch of FIG. 1 embodied by the computing device of FIG. 2, in accordance with an example embodiment of the present invention;

FIG. 4 is an example of an electronic message that is processed in accordance with an example embodiment of the present invention; and FIG. 5 is a signal flow diagram illustrating the messages exchanged in conjunction with the processing of either a pharmacy claim or a medical claim in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A method, computing device, and computer program product are provided in accordance with an example embodiment in order to process electronic messages having a first portion with a predefined format and a second, differently formatted second portion that includes additional information by analyzing the additional information, constructing other messages based thereupon and updating a database including one or more of the messages. The first portion of the electronic message may provide the information typically provided by a structured message. By providing for the inclusion of the additional information along with the first portion in the same electronic message, however, the electronic message may efficiently convey other types of information from a source to a recipient, thereby reducing or at least limiting any increase in the number of messages transmitted between the source and the recipient in order to convey the additional information which, in turn, reduces or limits any increase in the load otherwise imposed upon the network that supports the delivery of the electronic messages. Moreover, the additional information included in the electronic message may facilitate the provision of additional functionality and services by the recipient or others in response to the electronic message that was not previously available. For example, the method, computing device and computer program product of an example embodiment permit sufficient information to be included within the message such that some messages that otherwise must be submitted in batch format so as to generate a delayed response may now be submitted and processed and, as a result, generate a response in real time or near real time, thereby avoiding the delays and additional storage and processing requirements necessitated by batch processing and facilitating an enhanced user experience as a result of the timely responses for each of the different types of messages.

By way of example, a system 10 that is configured to communicate and process electronic messages having a first portion with a predefined format and a second, differently formatted second portion that includes additional information is depicted in FIG. 1. As shown, the electronic message may be provided by a source 12 and received by a service provider 14, such as a switch. After parsing and differently processing the different portions of the electronic message provided by the source, the service provider is configured to communicate with a request processor 16 and, in some embodiments, with other entities 18. Although the method, computing device and computer program product may be employed in various applications, the method, computing device and computer program product of example embodiments are employed in conjunction with electronic messages conveying additional information that communicated and processed in conjunction with telecommunication applications, content delivery and provisioning and healthcare applications, such as in conjunction with the submission and evaluation of prescription and/or medical claims, such as a prescription claim and/or a medical claim submitted by a pharmacy management system, and the provision of feedback regarding reimbursement of the pharmacy by a claims payor, e.g., an insurance company or the like, to name but a few.

The service provider 14 may be configured in various manners, but, in embodiment, the service provider includes a computing device 20 configured to parse and differently process different portions of an electronic message and may be embodied as shown in FIG. 2. In this regard, the computing device that embodies the service provider may include or otherwise be in communication with a processing system including, for example, processing circuitry 22 that is configurable to perform actions in accordance with example embodiments described herein. The processing circuitry may be configured to perform data processing, application execution and/or other processing and management services. The processing circuitry may include a processor 24 and memory 26 that may be in communication with or otherwise control a communication interface 28 and a database 30. The computing device may also include the communication interface and the database as shown in FIG. 2, or the communication interface and/or the database may be separate from, but in communication with, the computing device.

In an example embodiment, the memory 26 may include one or more non-transitory memory devices such as, for example, volatile and/or non-volatile memory that may be either fixed or removable. The memory may be configured to store information, data, applications, instructions or the like for enabling the computing device 20 to carry out various functions in accordance with example embodiments of the present invention. For example, the memory could be configured to buffer input data for processing by the processor 24. Additionally or alternatively, the memory could be configured to store instructions for execution by the processor.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry) specifically configured to perform operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

The communication interface 28 may include one or more interface mechanisms for enabling communication with the request processor 16 and other entities 18. In this regard, the communication interface may include, for example, an antenna (or multiple antennas) and supporting hardware and/or software for enabling the communications therewith.

The database 30 may be embodied by any of a variety of data storage devices such as a Network Attached Storage (NAS) device or devices, or as a separate database server or servers. The database 30 includes information accessed and stored by the processing circuitry 22 to facilitate the operations of the service provider 14. For example, the database 30 may comprise a series of tables configured to store data received from one or more other entities and/or information regarding different types of messages and/or portions of different types of messages as described below.

The operations performed by the computing device 20 embodied by the service provider 14 are depicted in an example embodiment in FIG. 3. As shown in block 40 of FIG. 3, the computing device of an example embodiment, such as the processing circuitry 22, the processor 24, the communication interface 28 or the like, is configured to receive first data and second data. The second data is received more frequently than the first data with the second data serving to update the first data. Although different types of first data and second data may be received depending upon the application and, as such, the type of electronic message that is parsed and processed, the first data and the second data of one example embodiment include information regarding a member of an insurance plan, e.g., a patient, and, as such, may be provided by a payor of the insurance plan, an insurance plan administrator or the like. As a more particular example, the first data relating to a member of an insurance plan may include member data including one or more of eligibility requirements for the member, benefits information including an identification of the claims which will be covered and to what extent, the deductible for which the member is responsible, any co-insurance or copay requirements for the member and/or the maximum out of pocket cost for which the member is responsible. Additionally, the first data of this example embodiment may include information that is not necessarily member specific, such as a fee schedule provided by a provider, or on behalf of a provider by the payer, indicative of the fees to be charged for various types of medical services.

In this example embodiment, the second data generally provides some of the same type of information as the first data, but provides a more current representation of the information. For example, the second data may include updated member information regarding the amount of the deductible that has been paid to date by the member as well as any updated information regarding coinsurance or copay requirements of the member. Further, the second data of an example embodiment may provide an indication as to the amount, if any, of a maximum out of pocket expense that remains to be paid by the member. The second data may be collected from various sources including one or more medical claims processors, medical claims payers or the like.

The second data is provided more frequently than the first data and serves to update the first data. The schedule with which the first data and the second data is provided may vary depending upon the application and/or other factors. In an example embodiment, however, the first data is provided annually or monthly, while the second data is provided daily or as often as the data changes.

As shown in block 42 of FIG. 3, the computing device 20, such as the processing circuitry 22, the processor 24 or the like, is configured to direct the first data for storage by the at least one database 30. The first data may be stored by the at least one database, such as in one or more tables. Likewise, the computing device, such as the processing circuitry, the processor or the like, is configured to direct the second data for storage by the at least one database. In one embodiment, the second data is stored in one or more tables of the database. The one or more tables in which the second data is stored may be different than the one or more tables in which the first data is stored. As noted above, the second data serves to update the first data. In order to provide for such updating, some values of the second data may overwrite corresponding values of the first data and be stored in place of the corresponding value of the first data. In other instances, however, both the first data and the second data are stored and the processing circuitry is configured to subsequently reference both the first data and the second data in order to obtain the most up-to-date representation of the desired information.

The computing device 20 of an example embodiment, such as the communication interface 28, the processing circuitry 22, the processor 24 or the like, is also configured to receive an electronic message from a source. Although different types of electronic messages may be received depending upon the application, the electronic message may be an electronic healthcare message, such as a prescription claim request, prescription reversal request, medical claims request, predetermination of benefits request or the like, generated by a pharmacy management system and directed to the service provider, e.g., switch, for processing and adjudication. In this embodiment, the electronic healthcare message typically includes information that identifies the patient, the medication, product, or service being requested, the healthcare provider (either the prescriber, pharmacy or both), and the benefit plan, insurer, or government-funded payor for the patient.

A pharmacy management system may be operated by a pharmacy in order to track the fulfillment of the various prescriptions and to submit prescription claims for reimbursement, requests for the predetermination of prescription benefits or the like via the service provider 14 to various claim processors in order to obtain an analysis of the prescription claim or other request submitted by the pharmacy management system and to identify, for example, the patient's out of pocket costs, typically in real time or near real time. In the context of a predetermination of prescription benefits request, the claims processor responds with an indication as to whether or not the prescription claim will be reimbursed and, if so, to what extent and the service provider, in turn, provides this information to the pharmacy management system. In light of the performance of an increasing number of medical services by a pharmacy or a medical clinic housed by a pharmacy, a pharmacy management system of an example embodiment may also be configured to submit medical claims for reimbursement, requests for the predetermination of medical benefits or the like. As described below and unlike the adjudication of prescription claims or the predetermination of prescription benefits, the medical claims or the request for the predetermination of medical benefits submitted by a pharmacy management system are not submitted via the service provider to various claim payors. Instead, the service provider stores sufficient information to adjudicate the medical claims, the requests for the predetermination of medical benefits or the like without interaction with the claim payors at the time of adjudication, thereby reducing the network load otherwise created by interaction with the claim payors of a medical claim at the time of adjudication. As such, the method, computing device and computer program product are able to provide a response, such as in real time or near real time, defining, for example, a patient's out of pocket costs, not only for the dispensing of prescriptions but also for the delivery of medical services. In an instance in which the service provider returns a response regarding the reimbursement expected for a particular prescription or medical service, a pharmacy management system may direct fulfillment of the prescription or delivery of the medical service and/or direct communication between a pharmacist or other provider and a patient regarding the cost of the prescription or medical service that is not reimbursable and that must be borne by the patient.

Regardless of the type of electronic message, the electronic message includes a first portion formatted in accordance with a first predefined format and a second portion formatted differently than the first predefined portion. As shown in block 46, the computing device 20, such as the processing circuitry 22, the processor 24 or the like, is configured to parse the electronic message so as to separately identify the first and second portions. The content provided by the first and second portions and the particular formats of the first and second portions may vary depending upon the application and the corresponding type of the electronic message. In the context of an electronic healthcare message, however, one example of an electronic message is depicted in FIG. 4. The electronic healthcare message 60 of this example embodiment includes a wrapper as defined by the header field 62. The header provides various information with respect to the electronic healthcare message, such as by identifying the electronic healthcare message to be of the type that includes a first portion formatted in accordance with a first predefined format and a second portion formatted differently than the first predefined portion. The header may also serve to secure the electronic healthcare message such that a recipient can access the payload of the electronic healthcare message only after having satisfied the security requirements imposed by the header.

The electronic healthcare message 60 of this example embodiment includes a qualifier field 64, such as a flag. A qualifier field of an example embodiment has a plurality of different predefined values with each predefined value representative of a different type of electronic healthcare message. For example, the qualifier field may have a first value to identify the electronic healthcare message to be related to a prescription, such as a prescription claim, a predetermination of prescription benefits request, a prescription reversal request or the like. The qualifier field of this example embodiment may also have a second value to identify the electronic healthcare message to be related to the provision of medical services, such as a medical claim, a predetermination of medical benefits request, a medical reversal request or the like.

The electronic healthcare message of the example embodiment also includes a first portion 66 formatted in accordance with a first predefined format and a second portion 68 formatted differently than the first predefined format. Although the first predefined format may vary from one electronic healthcare message to another, the first portion of an electronic healthcare message of an example embodiment is formatted in accordance with the National Council for Prescription Drug Programs (NCPDP) telecommunications standard that is utilized in conjunction with the submission of prescription claim requests. In contrast, the second portion of the electronic healthcare message may have any of a variety of different formats with the format of the second portion being different that the first predefined format. The qualifier field may include different values indicative of the presence or absence of the second portion, the presence or absence of the first portion as well as an indication as to whether or not the first portion is formatted in accordance with NCPDP.

Following parsing of the electronic message, the computing device 20 embodied by the service provider 14, such as the processing circuitry 22, the processor 24 or the like, is configured to analyze the electronic message to identify an action to be taken based thereupon. See block 48 of FIG. 3. With respect to an electronic healthcare message 60 of the type depicted in FIG. 4, for example, the computing device, such as the processing circuitry, the processor or the like, is configured to analyze the qualifier field to determine the action to be taken. For example, the analysis of the qualifier field may determine whether the electronic healthcare message relates to a prescription or to the provision of medical services. Based upon a determination as to whether the electronic healthcare message relates to a prescription or to the provision of medical services, the action to be taken in response to the electronic healthcare message, may be determined since different actions are taken in accordance with an example embodiment depending upon whether the electronic healthcare message relates to a prescription or to the provision of medical services.

After having parsed the electronic message and in an instance a determination is made that a first action is to be taken, such as a result of an electronic healthcare message relating to a prescription (as opposed to the provision of medical services), the computing device 20, such as the processing circuitry 22, the processor 24, the communication interface 28 or the like, is configured to construct a first message to be transmitted to the request processor 16. See block 50 of FIG. 3. The first message is based at least in part upon the first portion of the electronic message and, in some embodiments, includes the first portion from the electronic message received from the source. In the context of an electronic healthcare message, the first message that is constructed may be a prescription reimbursement request or a predetermination of prescription benefits request that is transmitted to a claims processor, such as a claims processor of a payor of prescription claims, e.g., an insurance company. A claims processor is configured to analyze the prescription reimbursement request or the predetermination of prescription benefits request based upon the insurance or other payor rules and to provide a response indicative of whether coverage is provided for the prescription claim that is the subject of the request and, if so, the reimbursement amount that will be paid by the payor to the pharmacy upon dispensation of the medication that is the subject of the prescription. As noted above, the first message that is transmitted to the claim processor in this example embodiment is based at least in part upon the first portion of the electronic healthcare message and, in some embodiments, includes the first portion of the electronic healthcare message since claims processors may be configured to interpret and analyze a prescription reimbursement request or a predetermination of prescription benefits request submitted in accordance with the first predefined format, such as NCPDP, and do not correspondingly interpret and analyze prescription reimbursement requests or predetermination of prescription benefits requests submitted in accordance with a different format.

Based upon the first message including the first portion, the computing device 20, such as the processing circuitry 22, the processor 24 or the like, is configured to receive a first response from the request processor 16 and, based upon the first response from the request processor, to construct a response to the electronic message to be provided, such as to the source. See blocks 52 and 58 of FIG. 3. As such, the source can receive information, such as feedback or the like, based upon the first portion of the electronic message from the request processor with the computing device embodied by the service provider 14 serving to appropriately configure and direct the first message and the response thereto between the request processor and the source.

In the context of an electronic healthcare message, the first response may provide an indication as to the coverage provided by the claims payor for the prescription that is the subject of the prescription reimbursement request or the predetermination of prescription benefits request. If coverage is provided, the first response may provide a reimbursement amount indicative of the monetary amount for which the pharmacy will be reimbursed by the claims payor in response to dispensation of the medicine that is the subject of the prescription. If coverage is not provided, however, the first response may provide an indication as to the reason for denial of the prescription reimbursement request or the predetermination of prescription benefits request. Based upon the first response from the claims processor, the computing device of this example embodiment causes a response to the electronic healthcare message to be provided, such as to the pharmacy management system. Thus, the pharmacy management system is provided with a response that includes the information provided by the claims processor, such as an indication as to whether the claims payor provides coverage for the prescription reimbursement request or the predetermination of prescription benefits request and, if so, the reimbursement amount associated therewith. Based upon the response to the electronic healthcare message provided by the service provider 14, a pharmacist may proceed to dispense the medication that is the subject of the prescription in an instance in which the pharmacy is to be fully reimbursed by the claims payor or may counsel the patient as to the out-of-pocket amount that the payor must personally pay prior to dispensing the medication in an instance in which the reimbursement amount is less than the full cost of the medication.

Based upon the parsing of the electronic message and the analysis of the electronic message, such as the qualifier field 64, the service provider 14 is configured to provide additional functionality based upon the second portion of the electronic message. For example, based upon an analysis of the electronic message, such as the qualifier field, the computing device 20, such as the processing circuitry 22, the processor 24 or the like, may determine that a second action, different then the first action, is to be taken. In the context of an electronic healthcare message 60 in which the qualifier field indicates whether the electronic healthcare message relates to a prescription or, alternatively, to the provision of medical services, the determination that the qualifier field indicates that the electronic healthcare message relates to the provision of medical services, albeit, for example, by a pharmacy or a medical clinic of a pharmacy, will cause the computing device, such as the processing circuitry, the processor or the like, to determine that a second action is to be taken. In this example embodiment, the second action to be taken involves the adjudication of a medical reimbursement request, a predetermination of medical benefits request or the like. Unlike the first action relating to a prescription that relies upon a third party, such a request processor 16, for the adjudication of the prescription reimbursement request or the predetermination of prescription benefits request, the computing device, such as the processing circuitry, the processor or the like, adjudicates the medical reimbursement request or the predetermination of medical benefits request itself without reliance upon a request processor, such as a claims processor, at the time of adjudication, thereby reducing the network load otherwise created by interaction with the claim payors of a medical claim at the time of adjudication and providing for a more timely response, such as in real time or near time, than provided by batch type processes.

In an instance in which the computing device 20 determines that a second action is to be taken, such a result of the qualifier field 64 indicating that an electronic healthcare message relates to the provision of medical services, the computing device, such as the processing circuitry 22, the processor 24 or the like, is configured to construct the medical reimbursement request, the predetermination of medical benefits request or the like from information included within the second portion 68 of the electronic healthcare message and, in some embodiments, in combination with some of the information from the first portion 66 of the electronic healthcare message. In this regard, the computing device, such as a processing circuitry, the processor or the like, is configured to obtain data values from a plurality of predefined fields in the second portion of the electronic healthcare message and, in some embodiments, to combine the data values drawn from predefined fields of the second portion with data values from one or more fields of the first portion of electronic healthcare message to construct the medical reimbursement request, the predetermination of medical benefits request or the like.

Thereafter, as shown in block 54 of FIG. 3, the computing device 20, such as the processing circuitry 22, the processor 24 or the like, is configured to access at least one database 30 and to determine a second response based on first and second data obtained from the at least one database. Based on the first and second data, the computing device of the service provider 14, such as the processing circuitry, the processor or the like, is configured to determine for a particular medical service, the reimbursement to be provided by the payor, such as an insurance company, and/or the out-of-pocket cost for which the patient is responsible based upon, for example, the schedule of fees of the provider, the eligibility of the patient for coverage for the respective medical service and member information defining their deductible, coinsurance benefits, copay amounts, maximum out-of-pocket costs and the like. In this regard, the second response may provide an indication as to the coverage that will be provided, such as by a claims payor, for the medical services that are the subject of the medical reimbursement request, the predetermination of medical benefits request or the like. If coverage is provided, the second response may provide a reimbursement amount indicative of the monetary amount for which the pharmacy will be reimbursed by the claims payor for the provision of the medical services that are the subject of the electronic healthcare message. If coverage is provided, the second response may also provide an indication as to the out-of-pocket costs to be paid by the patient for the provision of the medical services due to, for example, the patient's copay and/or the failure of the patient to have satisfied their deductible and/or their maximum out-of-pocket costs. If coverage is not provided, however, the second response may, in some instances, provide an indication of the reason for the denial of the medical reimbursement request, the predetermination of medical benefits request or the like.

The computing device 20, such as the processing circuitry 22, the processor 24 or the like, is configured to then construct a response to the electronic message based upon the second response that was determined based upon the first and second data stored by the at least one database. See block 56 of FIG. 3. In some instances, the response that is constructed and transmitted to the source 12 in response to the electronic message is identical to the second response that was determined based upon the first and second data. Thus, the source, such as a pharmacy management system, is provided with the response that includes an indication as to whether coverage will be provided for the medical reimbursement request, the predetermination of medical benefits request or the like and, if so, the reimbursement amount associated therewith and/or the out-of-pocket payment that must be provided by the patient. Based upon the response to the electronic healthcare message, a healthcare professional may proceed to provide the medical services that were the subject of the electronic healthcare message in an instance in which the pharmacy is to be fully reimbursed by the claims payor or the healthcare professional may counsel the patient as to the out-of-pocket amount that the patient must personally pay prior to the provision of medical services in an instance in which the reimbursement amount is less than the full cost of the medical services.

In addition to providing a response to the electronic message to the source 12, such as a pharmacy management system, information regarding the adjudication of a medical reimbursement request, a predetermination of medical benefits request or the like may also be provided to another entity 18, such as the claims payor, e.g., an insurance company. The information provided to the payor may include detailed information regarding the adjudicated medical claim, such as the adjudicated medical reimbursement request or the adjudicated predetermination of medical benefits request. The information provided to the other entity, such as the payor, may also include member information, such as out-of-pocket payments provided by the patient for receipt of the medical services such that the payments by the patient may be applied to the patient's deductible and/or may reduce the patient's maximum out-of-pocket cost.

As shown in block 58 and regardless of whether the first action or the second action was taken, the computing device 20, such as the processing circuitry 22, the processor 24, the database 30 or the like, is also configured to store one or more of the electronic message, the first message to the request processor 16, the first response from the request processor, the second response based upon the first and second data stored by the at least one database and/or the response to the electronic message in the database. For example, each of these messages and responses may be stored in the database, such as in separate tables with each table of the database configured to store a different type of message or response. As such, the database allows prior messages and responses to be readily recalled without having to re-construct the messages or responses. In addition, the database provides an audit trail associated with the handling of the different electronic requests.

An example in which the method, computing device and computer program product of an example embodiment receive and process an electronic message, such as an electronic healthcare message, that may relate either to the dispensation of medicine pursuant to a prescription or the provision of medical services is depicted in FIG. 5. In this example embodiment and as shown by signal flow 1, one or more entities 18, such as claims payors, e.g., insurance companies, provide first data to a service provider 14 regarding the member as described above. In some embodiments, the one or more entities may also include the provider who provides first data in the form of a fee schedule. As shown by signal flow 2 of FIG. 5, the one or more entities, such as one or more claims payors, may also provide second data to the service provider regarding the member, as also described above. The second data is provided more frequently than the first data and serves to update the first data. Among other things, the first and second data may provide eligibility information for the patient as well as information regarding benefits available to the patient, the patient's deductible, coinsurance benefits, copayment obligations and the maximum out-of-pocket expense of the patient.

As shown at signal flow 3 of FIG. 5, the service provider 14 then receives an electronic message, such as an electronic healthcare message, from a source 12, such as a pharmacy management system of a pharmacy. The computing device 20 of the service provider, such as the processing circuitry 22, the processor 24 of the like, parses the electronic message to separately identify first and second differently formatted portions and then analyzes the electronic message to identify an action to be taken. For example, based upon a qualifier field 64 of the electronic message, the computing device of the service provider may determine whether the electronic healthcare message relates either to a prescription, such as a prescription reimbursement request or a predetermination of prescription benefits request, so as to trigger a first action to be taken, or to the provision of medical services, such as a medical reimbursement request or a predetermination of medical benefits request, so as to trigger a second action to be taken.

In an instance in which the electronic healthcare message relates to a prescription, the service provider 14 constructs a first message based on the first portion of the electronic message and transmits the first message to a request processor 16, such as a claims processor, for adjudication of the prescription claim, such as a prescription reimbursement request or a predetermination of prescription benefits request. See signal flow 4 of FIG. 5. The service provider then receives a first response from the request processor providing the results of the adjudication, such as the coverage provided for the prescription, as shown in signal flow 5 of FIG. 5. The service provider may then provide a response to the electronic message to the source 12, such as the pharmacy management system, based upon the first response from the request processor. As such, in the context of a prescription reimbursement request or a predetermination of prescription benefits request, the source, such as the pharmacy management system, is provided with information indicative of the coverage provided to the patient for the prescription.

In contrast, in an instance in which the electronic healthcare message relates to the provision of the medical services, the service provider 14 does not interact with the request processor 16 in order to adjudicate the medical claim. Instead, the service provider accesses the at least one database 30 and adjudicates the medical reimbursement request, the predetermination of medical benefits request or the like based upon the first data as updated by the second data and stored by the at least one database. Based upon the first data as updated by the second data, a second response to the electronic healthcare message is determined that provides the results of the adjudication as shown by the path designated 4/5 in FIG. 5. A response to the electronic healthcare message is then constructed from the second response and the resulting response is then transmitted to the source 12, such as the pharmacy management system, so as to provide an indication as to the coverage provided by a claims payor, such as a medical insurance company, for the provision of medical services including, for example, an indication of the out-of-pocket costs that must be borne by the patient. In addition to providing a response to the source as shown by signal flow 7 in FIG. 5, the service provider may provide adjudication information to another entity 18, such as the claims payor, relating to the adjudicated claim details and/or updated member information regarding additional out-of-pocket payments provided by the patient for the provision of medical services.

Thus, the computing device 20 of this example embodiment increases the efficiency with which prescription claims and medical claims are evaluated. In this regard, the computing device is responsive to a single type of message in order to convey both prescription claims and medical claims. Moreover, the computing device is configured to permit medical claims to be adjudicated without interaction with a request processor 16, such as a claims processor, at the time of adjudication, thereby reducing message traffic and increasing the speed with which responses to medical claims may be provided to a pharmacy. As such, a pharmacy can respond to patients more quickly, such as in real time or near real time, not only to prescription claims, but also to medical claims.

As noted above, FIG. 3 is a flowchart illustrating the operations performed by a method, apparatus and computer program product, such as computing device 10 of FIG. 2, in accordance with one embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 16 of a computing device employing an embodiment of the present invention and executed by a processor 14 of the computing device. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIG. 3, when executed, convert a computer or processing circuitry into a particular machine configured to perform an example embodiment of the present invention. Accordingly, the operations of FIG. 3 define an algorithm for configuring a computer or processing circuitry, e.g., processor, to perform an example embodiment. In some cases, a general purpose computer may be provided with an instance of the processor which performs the algorithm of FIG. 3 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions. In some embodiments, certain ones of the operations above may be modified or further amplified and additional optional operations may be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. For example, although the service provider 14 that embodies the computing device 20 is described to be a switch, the service provider and/or the computing device may be embodied by other entities, such as a pharmacy benefits manager (PBM), in other embodiments. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computing device configured to parse an electronic message and to construct multiple differently prioritized messages therefrom, the computing device comprising:
    a communication interface configured to receive electronic messages;
    at least one database; and
    processing circuitry configured to:
        direct first data associated with a member of an insurance plan received via the communication interface for storage by the at least one database;
        direct second data associated with the member of the insurance plan received via the communication interface for storage by the at least one database, wherein the second data is received more frequently than the first data and the second data represents a more current version of the first data and serves to provide an update to the first data;
        for a respective electronic message and based on a header field of the electronic message, parse the electronic message to separately identify a first portion of the electronic message formatted in accordance with the National Council for Prescription Drug Programs (NCPDP) telecommunications standard and a second portion of the electronic message formatted differently than the first portion;
        analyze the electronic message to identify one or more actions to be taken based thereupon;
        in response to identification of a first action related to a prescription claim, construct an adjudication request for the prescription claim based at least in part upon the first portion formatted in accordance with the NCPDP telecommunications standard to be transmitted to a request processor, wherein the adjudication request includes the first portion formatted in accordance with the NCPDP telecommunications standard;
        based upon the adjudication request including the first portion formatted in accordance with the NCPDP telecommunications standard, receive a first response from the request processor, wherein the first response comprises an indication as to coverage provided for the prescription claim of the adjudication request;
        in response to identification of a second action related to a provision of medical services, different than the first action and based upon the second portion, construct a medical services request comprising information from the second portion, access the at least one database, and determine, at the computing device and without reliance upon the request processor and interaction with a claims payer, a second response to the medical services request that is to be transmitted to a source of the electronic message based upon the first and second data stored by the at least one database, wherein the second response comprises an indication as to coverage provided by a claims payer for medical services of the medical services request; and
        based upon the second response determined at the computing device and based upon the first and second data stored by the at least one database, construct a third response to the electronic message that is to be transmitted to the claims payer, wherein the third response comprises adjudication information associated with the second response with the adjudication information including adjudicated claim details and updated member information regarding additional out-of-pocket payments provided by a patient for medical services,
    wherein the at least one database is also configured to store one or more of the electronic message, the first message, the first response, the second response or the response to the electronic message.

2. A computing device according to claim 1 wherein the processing circuitry is configured to parse the electronic message by parsing the electronic message to identify a qualifier field that identifies whether the first action or the second action is to be taken.

3. A computing device according to claim 1 wherein the first data comprises a first type of data regarding a first party and a second type of data regarding a second party, and wherein the second data serves to update the first type of data, but not the second type of data.

4. A computing device according to claim 1 wherein the processing circuitry is configured to determine the second response based upon the first and second data stored by the at least one database without reference to a resource external to the computing device.

5. A computing device according to claim 1 wherein the second action comprises an adjudication request for a medical claim from a pharmacy, and wherein the second response determined by the processing circuitry comprises a member liability for the medical claim.

6. A computing device according to claim 5 wherein the processing circuitry is further configured to transmit, via the communication interface, the member liability to the pharmacy and information regarding adjudication of the medical claim to the claims payer.

7. A computing device according to claim 1 wherein the first action comprises an adjudication request for a pharmacy claim, and wherein the processing circuitry is further configured to transmit, via the communication interface, member liability for the pharmacy claim to the pharmacy without transmission of information regarding adjudication of the pharmacy claim to the claims payer following receipt of the first response from the request processor.

8. A method for parsing and differently processing electronic messages, the method comprising:
    receiving first data associated with a member of an insurance plan and second data associated with the member of the insurance plan via a communication interface, wherein the second data is received more frequently than the first data;

directing the first data received via the communication interface for storage by at least one database;

directing the second data received via the communication interface for storage by the at least one database, wherein the second data is received more frequently than the first data and the second data represents a more current version of the first data and serves to provide an update to the first data;

for a respective electronic message and based on a header field of the electronic message, parsing the electronic message to separately identify a first portion of the electronic message formatted in accordance with the National Council for Prescription Drug Programs (NCPDP) telecommunications standard and a second portion of the electronic message formatted differently than the first portion;

analyzing the electronic message to identify one or more actions to be taken based thereupon;

in response to identification of a first action related to a prescription claim, constructing an adjudication request for the prescription claim based at least in part upon the first portion formatted in accordance with the NCPDP telecommunications standard to be transmitted to a request processor, wherein the adjudication request includes the first portion formatted in accordance with the NCPDP telecommunications standard;

based upon the adjudication request including the first portion formatted in accordance with the NCPDP telecommunications standard, receiving a first response from the request processor, wherein the first response comprises an indication as to coverage provided for the prescription claim of the adjudication request;

in response to identification of a second action related to a provision of medical services, different than the first action and based upon the second portion, constructing a medical services request comprising information from the second portion, accessing the at least one database, and determining, at the computing device and without reliance upon the request processor and interaction with a claims payer, a second response to the medical services request that is to be transmitted to a source of the electronic message based upon the first and second data stored by the at least one database, wherein the second response comprises an indication as to coverage provided by a claims payer for medical services of the medical services request;

based upon the second response determined at the computing device and based upon the first and second data stored by the at least one database, constructing a third response to the electronic message that is to be transmitted to the claims payer, wherein the third response comprises adjudication information associated with the second response with the adjudication information including adjudicated claim details and updated member information regarding additional out-of-pocket payments provided by a patient for medical services; and storing, in the at least one database, one or more of the electronic message, the first message, the first response, the second response or the response to the electronic message.

9. A method according to claim 8 wherein parsing the electronic message comprises parsing the electronic message to identify a qualifier field that identifies whether the first action or the second action is to be taken.

10. A method according to claim 8 wherein the first data comprises a first type of data regarding a first party and a second type of data regarding a second party, and wherein the second data serves to update the first type of data, but not the second type of data.

11. A method according to claim 8 wherein the second response is determined based upon the first and second data stored by the at least one database without reference to a resource external to the computing device.

12. A method according to claim 8 wherein the second action comprises an adjudication request for a medical claim from a pharmacy, and wherein the second response that is determined comprises a member liability for the medical claim.

13. A method according to claim 12 further comprising transmitting, via the communication interface, the member liability to the pharmacy and information regarding adjudication of the medical claim to the claims payer.

14. A method according to claim 8 wherein the first action comprises an adjudication request for a pharmacy claim, and wherein the method further comprises transmitting, via the communication interface, member liability for the pharmacy claim to the pharmacy without transmission of information regarding adjudication of the pharmacy claim to the claims payer following receipt of the first response from the request processor.

15. A computer program product configured to parse and differently process electronic messages, the computer program product comprising a non-transitory computer readable medium having program code stored thereon, the program code comprising program code instructions configured, upon execution, to:

receive first data associated with a member of an insurance plan and second data associated with the member of the insurance plan via a communication interface, wherein the second data is received more frequently than the first data;

direct the first data received via the communication interface for storage by at least one database;

direct the second data received via the communication interface for storage by the at least one database, wherein the second data is received more frequently than the first data and the second data represents a more current version of the first data and serves to provide an update to the first data;

for a respective electronic message and based on a header field of the electronic message, parse the electronic message to separately identify a first portion of the electronic message formatted in accordance with the National Council for Prescription Drug Programs (NCPDP) telecommunications standard and a second portion of the electronic message formatted differently than the first portion;

analyze the electronic message to identify one or more actions to be taken based thereupon;

in response to identification of a first action related to a prescription claim, construct an adjudication request for the prescription claim based at least in part upon the first portion formatted in accordance with the NCPDP telecommunications standard to be transmitted to a request processor, wherein the adjudication request includes the first portion formatted in accordance with the NCPDP telecommunications standard;

based upon the adjudication request including the first portion formatted in accordance with the NCPDP telecommunications standard, receive a first response from the request processor, wherein the first response comprises an indication as to coverage provided for the prescription claim of the adjudication request;

in response to identification of a second action related to a provision of medical services, different than the first action and based upon the second portion, construct a medical services request comprising information from the second portion, access the at least one database, and determine, at the computing device and without reliance upon the request processor and interaction with a claims payer, a second response to the medical services request that is to be transmitted to a source of the electronic message based upon the first and second data stored by the at least one database, wherein the second response comprises an indication as to coverage provided by a claims payer for medical services of the medical services request;

based upon the second response determined at the computing device and based upon the first and second data stored by the at least one database, construct a third response to the electronic message that is to be transmitted to the claims payer, wherein the third response comprises adjudication information associated with the second response with the adjudication information including adjudicated claim details and updated member information regarding additional out-of-pocket payments provided by a patient for medical services; and cause storage, in the at least one database, of one or more of the electronic message, the first message, the first response, the second response or the response to the electronic message.

16. A computer program product according to claim 15 wherein the program code instructions configured to parse the electronic message comprise program code instructions configured to parse the electronic message to identify a qualifier field that identifies whether the first action or the second action is to be taken.

17. A computer program product according to claim 15 wherein the first data comprises a first type of data regarding a first party and a second type of data regarding a second party, and wherein the second data serves to update the first type of data, but not the second type of data.

18. A computer program product according to claim 15 wherein the second response is determined based upon the first and second data stored by the at least one database without reference to a resource external to the computing device.

19. A computer program product according to claim 15 wherein the second action comprises an adjudication request for a medical claim from a pharmacy, wherein the second response that is determined comprises a member liability for the medical claim, and wherein the program code further comprises program code instructions configured to cause transmission, via the communication interface, of the member liability to the pharmacy and information regarding adjudication of the medical claim to the claims payer.

20. A computer program product according to claim 15 wherein the first action comprises an adjudication request for a pharmacy claim, and wherein the program code further comprises program code instructions configured to cause transmission, via the communication interface, of member liability for the pharmacy claim to the pharmacy without transmission of information regarding adjudication of the pharmacy claim to the claims payer following receipt of the first response from the request processor.

21. The method according to claim 1, wherein the medical services request comprises a medical reimbursement request or a predetermination of medical benefits request.

22. The method according to claim 1, wherein constructing the medical services request comprises:
combining one or more data values of one or more fields of the second portion with one or more data values of one or more fields of the first portion.

23. The method according to claim 1, wherein the second response comprises one or more of an indication of a monetary reimbursement amount or an indication of an out-of-pocket expense to be paid by the member of the insurance plan for the provision of medical services.

* * * * *